US012792332B2

(12) United States Patent
Gupta et al.

(10) Patent No.: US 12,792,332 B2
(45) Date of Patent: Nov. 10, 2026

(54) CREATION OF DYNAMIC FIRMWARE BASED ON CHANGING PLATFORM AND BMC PERSONALITIES IN A DC-MHS ENVIRONMENT

(71) Applicant: American Megatrends International, LLC, Duluth, GA (US)

(72) Inventors: Chitrak Gupta, Kolkata (IN); Sriram Santhanam, Madampakkam (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 292 days.

(21) Appl. No.: 18/411,450

(22) Filed: Jan. 12, 2024

(65) Prior Publication Data

US 2025/0231753 A1 Jul. 17, 2025

(51) Int. Cl.

| | |
|---|---|
| ***G06F 8/61*** | (2018.01) |
| ***G06F 8/65*** | (2018.01) |
| ***G06F 9/4401*** | (2018.01) |
| ***G06F 11/36*** | (2025.01) |

(52) U.S. Cl.

CPC .................. *G06F 8/63* (2013.01); *G06F 8/65* (2013.01); *G06F 9/4401* (2013.01); *G06F 11/36* (2013.01)

(58) Field of Classification Search

CPC ..... G06F 8/63; G06F 8/65; G06F 9/44; G06F 11/36

See application file for complete search history.

(56) References Cited

U.S. PATENT DOCUMENTS

| | | | | |
|---|---|---|---|---|
| 7,590,835 | B1 * | 9/2009 | Nallagatla ........... | G06F 9/44505 717/169 |
| 9,116,775 | B2 | 8/2015 | Thodati et al. | |
| 10,114,637 | B1 * | 10/2018 | Willson .................... | G06F 8/71 |
| 10,346,187 | B1 * | 7/2019 | Trier ........................ | G06F 9/455 |
| 11,449,427 | B2 | 9/2022 | Kuyel | |
| 2007/0152058 | A1 * | 7/2007 | Yeakley .................. | G06F 16/81 235/375 |
| 2013/0346800 | A1 * | 12/2013 | Gulati ..................... | G06F 11/27 714/E11.17 |

(Continued)

OTHER PUBLICATIONS

Vasquez, Frank, and Chris Simmonds. "Preface," "Chapter 3," "Chapter 6," "Chapter 7," "Chapter 8," "Chapter 10." Mastering Embedded Linux Programming. Third ed., Packt Publishing, 2021. O'Reilly. (Year: 2021).*

(Continued)

*Primary Examiner* — Wei Y Mu
*Assistant Examiner* — Feven H Huruy
(74) *Attorney, Agent, or Firm* — Tim Tingkang Xia, Esq.; TROUTMAN PEPPER LOCKE LLP

(57) ABSTRACT

In an aspect of the disclosure, a method, a computer-readable medium, and an apparatus are provided. The apparatus initializes a build orchestrator configured to monitor system events from different server systems. The apparatus receives, at the build orchestrator, an event indicating a hardware change in a modular hardware system. The apparatus selects, by the build orchestrator, appropriate firmware components for the identified hardware change. The apparatus assembles the selected firmware components into the customized firmware image tailored to the identified hardware change.

20 Claims, 6 Drawing Sheets

300

(56) References Cited

U.S. PATENT DOCUMENTS

| | | | | |
|---|---|---|---|---|
| 2015/0052596 | A1* | 2/2015 | Ayanam | H04W 4/38 726/8 |
| 2017/0300690 | A1* | 10/2017 | Ladnai | G06F 21/554 |
| 2020/0026505 | A1 | 1/2020 | Olderdissen | |
| 2020/0044928 | A1* | 2/2020 | Devireddy | H04L 41/0816 |
| 2021/0026711 | A1* | 1/2021 | Ovadia | H04L 69/16 |
| 2022/0066890 | A1* | 3/2022 | Drury | G06F 11/2005 |
| 2022/0374223 | A1* | 11/2022 | Huang | G06F 8/65 |
| 2022/0405092 | A1* | 12/2022 | Miedema | G06F 8/60 |
| 2024/0303339 | A1* | 9/2024 | Paulraj | H04L 9/3268 |
| 2024/0385866 | A1* | 11/2024 | Peterson | G06F 9/45558 |

OTHER PUBLICATIONS

Chung, Kyung Ho, et al. "A Study on the Packaging for Fast Boot-up Time in the Embedded Linux," 13th IEEE International Conference on Embedded and Real-Time Computing Systems and Applications (RTCSA 2007), Daegu, Korea (South), 2007, pp. 89-94, doi: 10.1109/RTCSA.2007.13. (Year: 2007).*

Bobroff, Zachary. "Using Capsules for Firmware Configuration Update." American Megatrends, 2019. (Year: 2019).*

Fang, Tian, "Introducing "OpenBMC": an open software framework for next-generation system management", Mar. 10, 2015. <https://engineering.fb.com/2015/03/10/open-source/introducing-openbmc-an-open-software-framework-for-next-generation-system-management/> (Year: 2015).*

* cited by examiner

600

CREATION OF DYNAMIC FIRMWARE BASED ON CHANGING PLATFORM AND BMC PERSONALITIES IN A DC-MHS ENVIRONMENT

BACKGROUND

Field

The present disclosure relates generally to computer systems, and more particularly, to techniques of dynamic firmware based on changing platform and baseboard management controller (BMC) personalities.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture. The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus initializes a build orchestrator configured to monitor system events from different server systems. The apparatus receives, at the build orchestrator, an event indicating a hardware change in a modular hardware system. The apparatus selects, by the build orchestrator, appropriate firmware components for the identified hardware change. The apparatus assembles the selected firmware components into the customized firmware image tailored to the identified hardware change.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
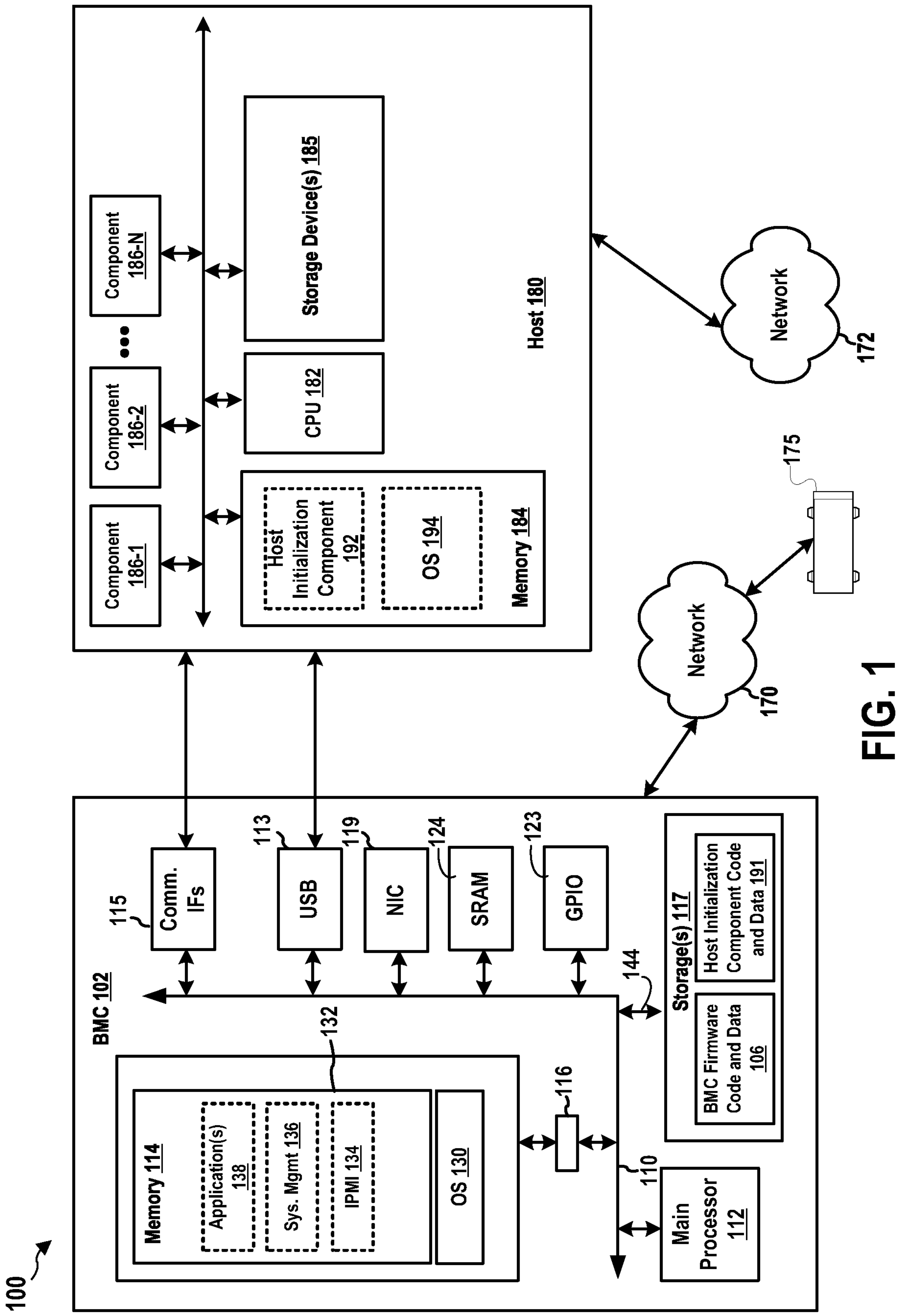
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 an BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170. Further, the storage(s) 117 is in communication with the communication channel 110 through a communication link 144.

The server market is currently witnessing a significant transformation due to most Original Equipment Manufacturers (OEMs) and Cloud Service Providers (CSPs) moving towards a modular hardware architecture in their server platforms. Open Compute Project (OCP) details the modularization criteria through its server hardware specifications. The idea behind this approach is to create a hardware ecosystem that is flexible, scalable, and easily upgradable, aligning with the rapid pace of technology advancements in server components.

The Data Center Ready-Modular Hardware System (DC-MHS) specification outlines the essential components of a modular platform. Key to this architecture is the facility it provides for CSPs and OEMs to upgrade existing systems without the need to invest in entirely new server platforms. The components within the servers, such as processors, storage devices, and management controllers, are designed to be replaceable or upgradable as individual units. This approach significantly reduces the Total Cost of Ownership (TCO) for the organizations, as components can be updated or replaced as needed, without a full system overhaul.

One of the primary benefits of adopting the DC-MHS guidelines is the agility it lends to system upgrades. Instead of the lengthy process traditionally involved in replacing or upgrading whole servers, modular components can be slotted in with minimal disruption, greatly accelerating the upgrade lifecycle and ensuring that server platforms can keep pace with evolving workloads and technological advancements.

A DC-MHS includes a Data Center Security and Control Module (DC-SCM). It incorporates essential subsystems such as the Baseboard Management Controller (BMC) stack and the Hardware Root of Trust (ROT).

The DC-SCM is a compact module designed as a daughter card to be integrated onto a server motherboard. The DC-SCM encapsulates several critical management functionalities that are central to the operation and integrity of the server system. The DC-SCM's infrastructure allows it to be easily swapped out or upgraded without the necessitation of replacing the entire server.

The DC-SCM includes a BMC stack. The BMC stack is responsible for the monitorization of the server's hardware state, facilitating remote management capabilities such as power control, system restoration, and logging. The BMC supports the server's lifecycle by providing diagnostic tools, the ability to update firmware, and manage hardware settings even when the server OS is not running. The modularity of BMC within the DC-SCM means that, as server management needs evolve or as new BMC technology gets introduced, the BMC functionality can be updated or replaced independent of other hardware components.

The DC-SCM includes a Hardware Root of Trust (ROT). The ROT is essentially a trusted source of verification for software and firmware loads on the server, establishing a baseline of trust for all operations. It ensures that only signed, verified code is executed on startup to prevent unauthorized firmware from compromising server integrity.

The ROT mechanism functions as the root for all trust chains on the server, and integrating it within the DC-SCM enables a secure boot process.

The DC-MHS further includes a Host Processor Module (HPM). The HPM functions as the 'brain' of the system, hosting processors such as CPUs (Central Processing Units), GPUs (Graphics Processing Units), IPUs (Infrastructure Processing Units), DPUs (Data Processing Units), and accompanying DIMMs (Dual Inline Memory Modules) to provide computing and processing capabilities necessary for running applications and managing workloads.

With the modular approach of DC-MHS, the HPM, including its various processor types and memory, becomes a replaceable unit within the server architecture. Such modularity permits on-the-fly upgrades of the HPM to adapt to new technologies, workloads, or performance goals without the need for comprehensive system replacement. From swapping an outdated CPU to a more powerful one or adding high-capacity DIMMs, the HPM acts as an interchangeable module, facilitating seamless transitions and continuous performance optimization.

The DC-MHS also includes Modular I/O (DC-MIO). The DC-MIO deals with the varied input/output requirements of modern data centers, encapsulating subsystems for storage, network interface cards (NICs), accelerators, and a range of interconnect technologies. These modular components are utilized for a server's connectivity and throughput capabilities to specific workload demands.

The DC-MHS also utilizes SMART Network Interface Cards (NICs) and Data Plane technologies. SMART-NICs are advanced network cards with built-in processors-often based on Field-Programmable Gate Array (FPGA) technology or specific multicore CPUs—that can offload processing tasks from the server's central processing units (CPUs). These network interface cards enable sophisticated processing at the network edge, closer to where data is entering or leaving the server. This form of processing enables efficient data plane operations-those tasks concerned with the forwarding of data packets through the network.

The modular architecture of the DC-MHS improves server upgradeability and system management.

The DC-MHS utilizes modular hardware, enabling easy replacement of components and facilitating easy upgrades. Individual components of the DC-MHS, such as the Host Processor Module (HPM), the DC-SCM, and the Modular I/O, can be interchanged without the requirement of overhauling the entire server infrastructure.

Changes in the HPM can result in the creation of entirely new systems. An HPM upgrade, such as the replacement of a CPU with a more advanced variant, transforms the system's capabilities, aligning it with current performance requisites or specific computational needs.

The modular architecture enables a pay-as-you-go model. This model allows for incremental investments, where CSPs and OEMs can strategically upgrade hardware components based on evolving performance requirements or budget considerations, as opposed to incurring the cost of complete server replacements.

Changes to platform devices necessitate dynamic firmware capabilities, to ensure that upgrades or alterations in hardware are adequately supported by the system's software. An adaptable firmware framework can respond to changes in the HPM or other components, thus maintaining the integrity and functionality of the server's operations. The adaptable firmware framework serves this purpose by dynamically constructing firmware images tailored to the new configuration.

With the advent of a modular design, device and sensor configurations are no longer static but become dynamic entities within the server ecosystem. As components are added, removed, or upgraded, sensor configurations adapt accordingly, ensuring the ongoing accurate monitoring and management of server health and performance parameters.

Further, the DC-SCM enables changes to be made in the management module. Accordingly, the BMC firmware are readily adaptable to support fresh deployments or upgrades.

Figure 2:
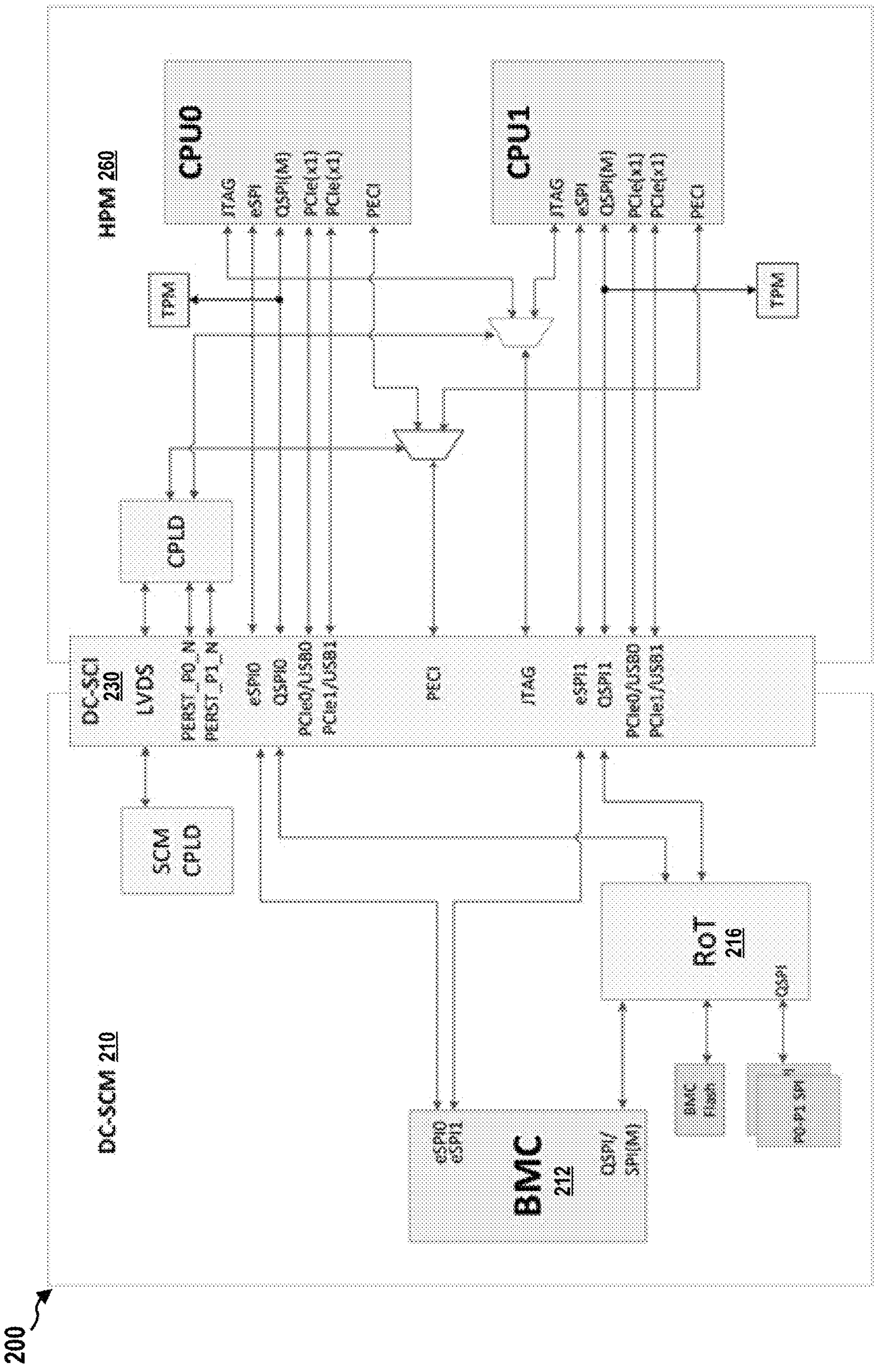
FIG. 2 is a diagram illustrating a modular hardware system.

FIG. 2 is a diagram illustrating a modular hardware system 200. The modular hardware system 200 includes a DC-SCM 210, a HPM 260. The DC-SCM 210 includes a BMC 212 and ROT 216, and a Data Center System Connection Interface (DC-SCI) 230. The HPM 260 includes a CPU0 and a CPU1. The DC-SCM 210 and the HPM 260 are connected via the DC-SCI 230. The DC-SCI 230 serves as the foundational communication backbone connecting the Data Center Security and Control Module (DC-SCM) 210 with the Host Processor Module (HPM) 260. It is equipped with a variety of interfaces and protocols designed to ensure a seamless and efficient data flow between the various server modules.

In the modular hardware system 200, the BMC 212 is part of the DC-SCM 210 and adheres to the specifications of the DC-SCM 210. As a replaceable unit within the DC-SCM 210, the BMC 212 may be transitioned between different BMC System-on-Chip (SOC) components provided by the OEMs and CSPs. Deployable firmware images may be supplied for these BMC modules. That is, the firmware are as interchangeable as the hardware components it manages. For example, the OpenBMC firmware is often used.

The Host Processor Module (HPM) may change in a DC-MHS system. In the example of FIG. 2, the HPM 260 functions as the computing module or "brain" of the modular hardware system 200, hosting processors such as CPUs and GPUs along with memory. If the HPM 260 is upgraded or swapped out, it essentially changes the platform, as a new compute module is introduced. For example, the CPU0 and CPU1 in the existing HPM 260 could be replaced with a newer generation processor. The DC-SCI 230 provides standardized connectivity between the HPM and other modules such as the DC-SCM 210, abstracting low-level interface details. However, the BMC 212 in the DC-SCM 210 still needs awareness of the physical interfaces provided by a new HPM for proper management and monitoring. The BMC 212, residing in the DC-SCM 210, recognizes these changes and interacts appropriately with the new physical interfaces provided by the altered HPM.

The BMC 212 encapsulated in the DC-SCM 210 may also change. As a replaceable daughter card unit, an outdated BMC 212 SOC component may be upgraded to a newer generation BMC SOC with different firmware requirements. Customers utilizing AMI's BMC firmware stack require the flexibility to Tailored BMC firmware images may be built and deployed for any SOC and platform combination that may arise from BMC swaps. That is, the necessary BMC firmware may be generated on-the-fly to accommodate both the SOC and platform configurations. The BMC image should also inherit necessary configurations from the previous BMC while seamlessly supporting the new module.

Device configurations in the modular hardware system 200 are expected to change over time due to hardware lifecycle management involving addition, removal, or upgrades of devices. The BMC firmware has capabilities to dynamically handle such changes in devices and sensors, discovering new devices added and managing them appropriately. The BMC 212 can handle device changes occurring.

The DC-SCI 230, as the primary conduit for communication and interaction among the modular components of the DC-MHS, adheres to a set standard specification. This standardization ensures that, despite the mutable nature of the aforementioned elements (HPM, BMC, and device configurations), the foundational interconnectivity remains consistent and reliable. The DC-SCI 230's role is to provide a stable and secure platform upon which these interchangeable components can operate cohesively.

In the modular hardware system 200 shown in FIG. 2, the DC-SCM 210 and HPM 260 are separate replaceable modules connected via the DC-SCI 230 interface. As discussed, the HPM 260 as the compute module can be swapped out or upgraded, essentially changing the platform. Similarly, the BMC 212 within the DC-SCM 210 is a replaceable daughter card unit that can also be changed to a newer generation BMC SOC.

To handle such mutable components and platforms, the BMC firmware also has portability. The firmware is configurable to support any alterations occurring in modules of the modular hardware system 200 such as the HPM 260 or BMC 212. For example, if the HPM 260 is swapped from one processor to another, the firmware of the BMC 212 can dynamically handle the new physical interfaces and devices presented by the changed HPM module.

Further, if the BMC 212 itself is upgraded to a newer SOC generation with different firmware requirements, the modular approach allows tailored BMC firmware images to be constructed on-the-fly based on both the new SOC and platform combination. A build orchestration system maintains repositories of SOC drivers, bootloaders, porting components etc. that can be pulled in dynamically to generate firmware images compatible with the new configurations. This firmware portability allows the BMC 212 to adapt to changes in the modular hardware system 200.

The BMC firmware architecture is a framework that includes Intellectual Properties (IP) and abstraction layers that cater to various silicon (i.e., processors) providers (e.g., Intel, AMD, NVIDIA, Qualcomm, and ARM). This multi-tiered architecture comprises the following features:

- Silicon Provider IP: This represents the proprietary technology or IP provided by the silicon manufacturers. For example, it includes specific drivers or firmware necessary to interact with CPUs such as CPU0 and CPU1 of the HPM 260.
- CSP IP: Cloud Service Provider (CSP) specific IPs that are tailored to the requirements of service providers managing cloud infrastructure.
- BMC Vendor IP: BMC Vendor contributes its proprietary IP as part of the firmware stack, ensuring integration with its suite of deployment and management tools.
- Application Abstraction (SDK): An SDK (Software Development Kit) layer abstracts the underlying complexity and provides a standardized set of tools for application development.
- Platform Abstraction (PDK): The Platform Development Kit (PDK) encapsulates platform-specific information and abstracts the complexities of hardware interaction. It aids in the discovery, management, and monitoring of devices and sensors connected to the modular server system.
- SOC Abstraction (HAL): A Hardware Abstraction Layer (HAL) that provides SOC-specific interfaces, thus creating a separation between the hardware specifics and the firmware logic.
- OpenBMC: A base framework for BMC firmware development.

These components of the BMC firmware architecture enable the firmware to dynamically handle each unique platform configuration, such as when the BMC 212 interfaces the HPM 260 whose components have been changed.

The SOC Abstractions may be provided within the Yocto build framework. The Yocto build framework is an open source tool for building custom Linux-based systems for embedded and IoT devices. The SOC abstraction layers provided by Yocto enables portability across different BMC SOCs. As part of the firmware architecture, abstractions for the BMC System-on-Chip (SOC) are provided in case the DC-SCM module containing the BMC is changed. The Yocto build framework provides these abstractions through modular metadata layers specific to each SOC.

These meta-<soc>layers contain the recipes, packages, configuration files etc. required to build the BMC firmware image for that particular SOC. For example, the meta-aspeed layer has everything needed to compile the firmware for an Aspeed AST2500 or AST2600 SOC. This includes the Linux kernel, bootloaders, drivers, libs, apps, configs etc. Similarly, there can be a meta-nuvoton layer for Nuvoton NPCM7xx SOCs.

If the hardware changes from Aspeed SOC to Nuvoton, a Build Orchestrator tool will include the meta-nuvoton layer instead of meta-aspeed during image generation. As such, the abstraction layers enable porting the firmware across different BMC SOC hardware with minimal changes to the rest of the firmware stack. When BMC hardware upgrade happens by replacing the BMC 212 with a newer generation BMC System-on-Chip (SOC), a tailored BMC firmware image are loaded promptly on the new module to minimize server downtime.

To enable rapid roll-out of firmware, the Build Orchestrator system maintains repositories of pre-built components such as kernel, bootloaders, configuration files etc. for various BMC SOCs. Specifically, the Yocto meta-layers contain modular recipes to build BMC firmware for a particular SOC. When the BMC 212 SOC is changed, the Build Orchestrator identifies the target hardware and injects the appropriate meta-layer into the build process to generate firmware with relevant kernel, drivers, libs suited to the new BMC chip. Additionally, Platform Configuration Capsules store modular device configurations needed for discovery and sensor management on that specific server platform. By bringing together these hardware-specific modules at build time, the orchestration system can synthesize a customized, production-grade BMC image for deployment on the new DC-SCM BMC card. Thus, the configurable modular architecture enables rapid roll-out of tailored firmware to support hardware upgrades in line with the dynamic nature of modular platforms. In the modular hardware system 200, the platform configuration for the BMC 212 can be abstracted through modular platform-specific files handled dynamically at runtime. When the system changes due to HPM 260 alterations or other device modifications, corresponding platform-specific files are provided to the BMC 212 firmware to handle the new configuration.

These platform-specific files enabling device discovery, sensor monitoring, event actions etc. are packaged into modules called platform configuration capsules (PCCs). The PCCs may contain one or more of the following:

- Sensor Data Record (SDR) information: Detailing the mappings of sensors to their respective 12C buses within the modular server system, aiding in prescient sensor management.
- Platform event filter configurations: Seizing event messages tailored to specific chips-akin to Intel or any emerging variant- and configuring responsive actions pertinent to such events.
- Vendor platform-specific libraries and configurations, including Entity manager JSON files: Governing the establishment of settings and standards aligned with the AMI intellectual property's requirements.
- Platform-specific static tables, Management Controller Transport Protocol (MCTP) endpoint tables, Platform Level Data Model (PLDM) Platform Descriptor Records (PDRs): Furnishing static references which are instrumental for the identification and communication with different platform components.
- Power and thermal configurations and algorithms: Regulating the server's thermal profile and energy consumption, pivotal for maintaining operational efficiency and integrity within the DC-MHS.

For example, an "archercity" platform will have an archercity.pcc capsule. The PCC files packages are bound to the server platform with unique identifiers. The PCC files packages are accessible for download and integration at runtime from EMMC storage or a deployment cloud. For example, when the HPM 260 changes prompting an image rebuild, the appropriate PCC capsule for the new platform is downloaded by the BMC 212 providing the URL. The BMC 212 notifies the build orchestrator of HPM or device changes, passing the CPU info to build a tailored image.

Thus, platform-specifics are abstracted into modular PCCs handled dynamically allowing portable BMC 212 firmware across hardware changes like HPM swaps. The interconnect DC-SCI 230 remains standard between DC-SCM 210 and mutable modules like HPM 260. This firmware portability supports the flexible hardware upgrades in line with the dynamic modular architecture.

Figure 3:
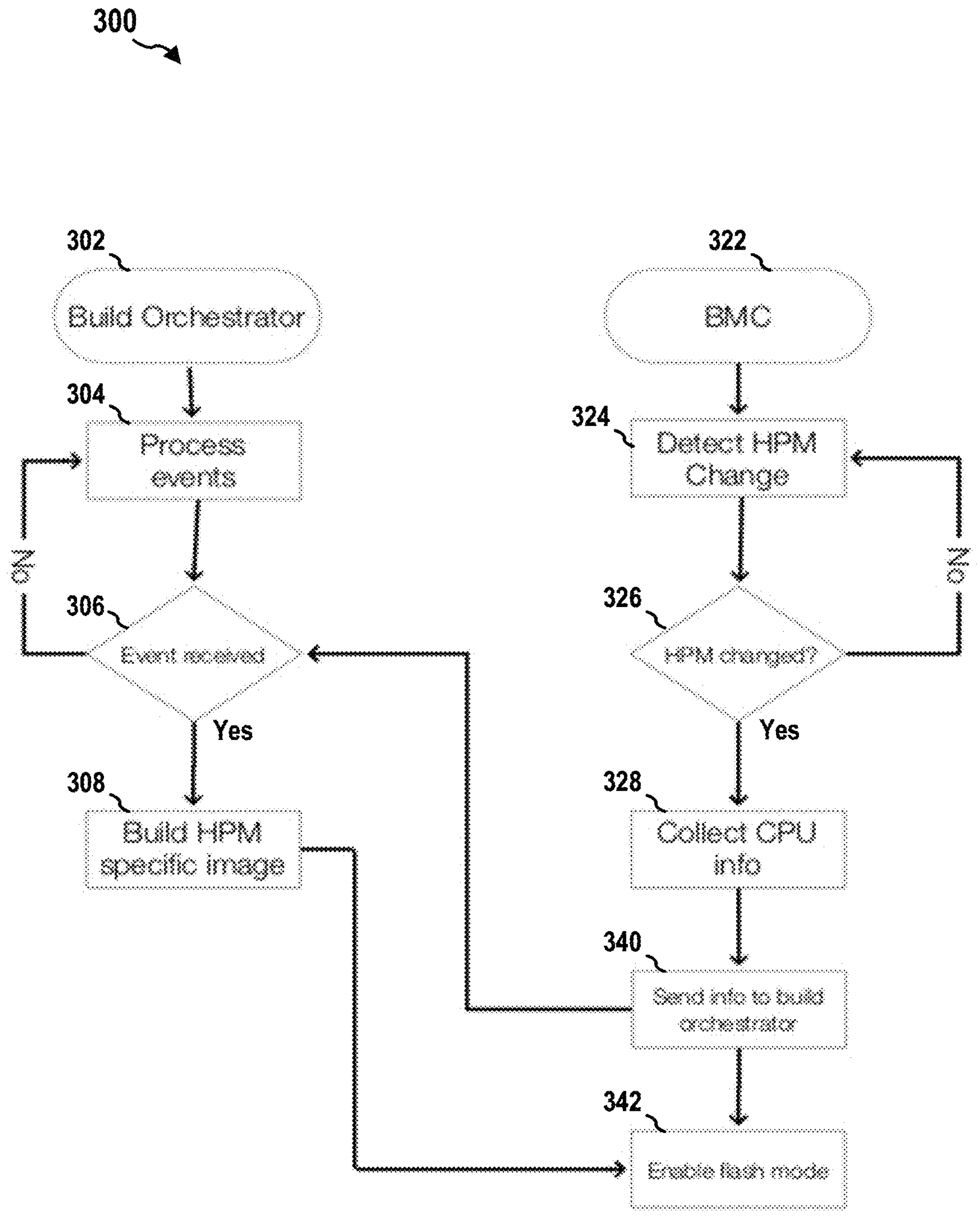
FIG. 3 is a flowchart illustrating a BMC firmware build orchestration process.

FIG. 3 is a flowchart illustrating a BMC firmware build orchestration process 300 of building a dynamic firmware image for a modular hardware system 200. In a first procedure, in operation 302, the build orchestrator initializes and starts monitoring system events from different server systems. The build orchestrator could be hosted on-premises or in the cloud at a particular URL, such as at cloud.vendor-.com, providing flexibility to accommodate data restrictions and intellectual property considerations. In operation 304, the build orchestrator continuously processes events received from the modular hardware system 200 and other systems. In particular, the build orchestrator listens for events from the BMC 212.

In operation 306, the build orchestrator checks if an event has been received. If an event has been received, the build orchestrator proceeds to operation 308. Otherwise, the build orchestrator returns to operation 304.

In operation 308, the build orchestrator builds an HPM-specific image. The HPM-specific image is a customized firmware image that is tailored to the specific HPM that is installed in the modular hardware system 200. The build orchestrator uses a build orchestration system to build the HPM-specific image. The build orchestration system maintains a repository of HPM-specific drivers, bootloaders, and other components. The build orchestration system uses these components to build the HPM-specific image.

In a second procedure. in operation 322, the BMC 212 initiates a monitoring process. In operation 324, the BMC 212 starts detecting HPM changes. For example, the BMC 212 may detect HPM changes by reading the Field Replaceable Unit (FRU) details of the HPM. The FRU details include information about the HPM's manufacturer, model, and serial number.

In operation 326, the BMC 212 checks if the HPM has changed. The BMC 212 compares the FRU details of the HPM to the FRU details that are stored in its memory. If the FRU details have changed, the BMC 212 proceeds to operation 328 to gather more detailed information about the changes. Otherwise, the BMC 212 returns to operation 324.

In operation 328, the BMC 212 collects CPU information. The CPU information includes the type of CPU, the number of cores, and the clock speed. The BMC 212 uses the CPU information to determine the appropriate firmware image for the HPM.

In operation 340, the BMC 212 sends the CPU information to the build orchestrator. The BMC 212 uses the build orchestrator's API to send the CPU information as an event.

In operation 306 described supra, the build orchestrator receives the CPU information from the BMC 212. The build orchestrator uses the CPU information to select the appropriate firmware image for the HPM.

In operation 308 described supra, the build orchestrator builds the dynamic firmware image. The dynamic firmware image is a customized firmware image that is tailored to the specific HPM and CPU that are installed in the modular hardware system 200. The build orchestrator uses a build orchestration system to build the dynamic firmware image. The build orchestration system maintains a repository of dynamic firmware images. The build orchestration system uses these images to build the dynamic firmware image.

In operation 342, the BMC 212 receives the dynamic firmware image from the build orchestrator. For example, the BMC 212 may use the build orchestrator's API to receive the dynamic firmware image. The BMC 212 further enables flash mode. Flash mode is a special mode that allows the BMC 212 to update the firmware image. The BMC 212 updates the firmware image. The BMC 212 uses the dynamic firmware image to update the firmware image. Subsequently, the BMC 212 reboots the system. The BMC 212 reboots the system so that the new firmware image can take effect.

Figure 4:
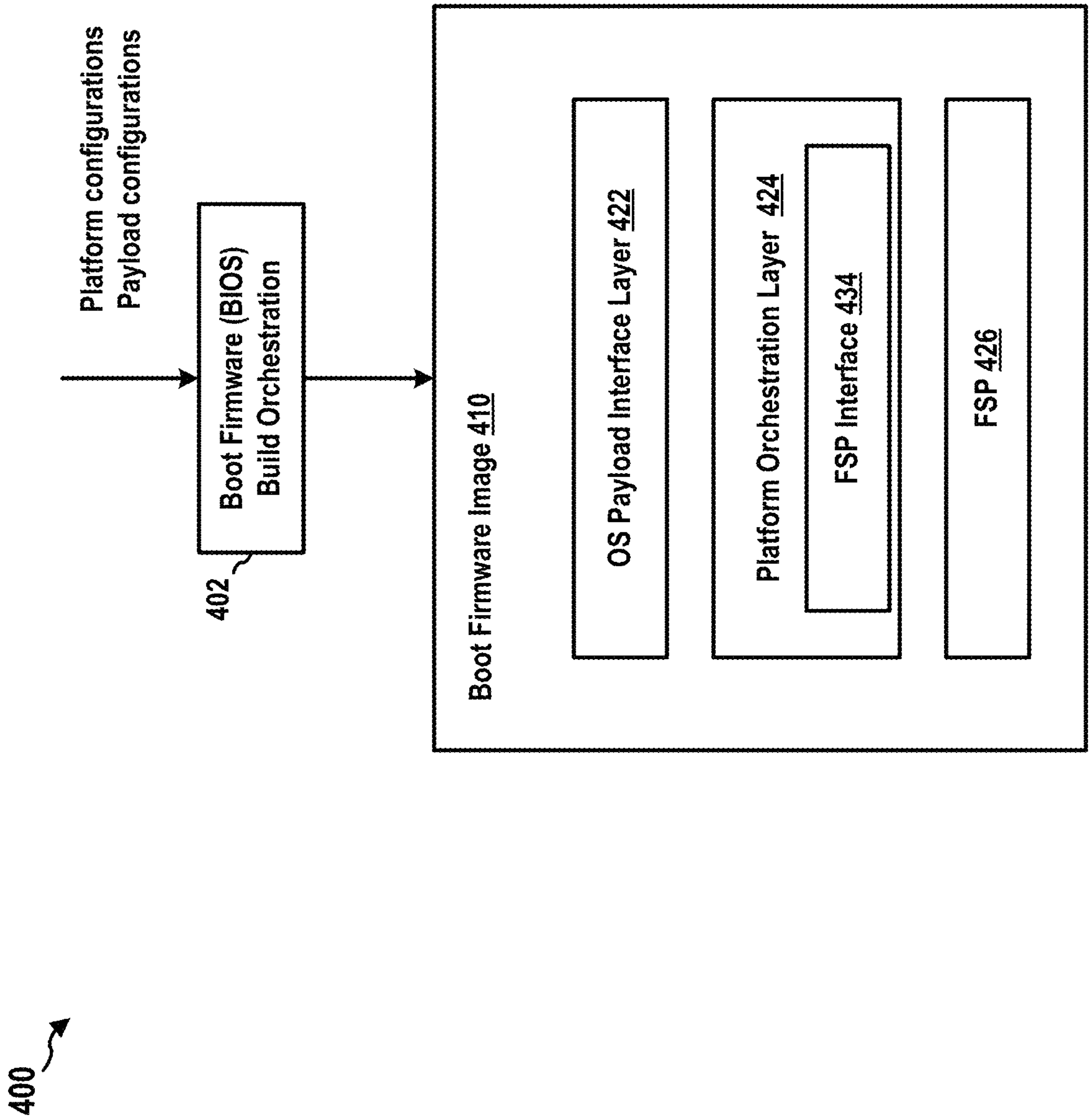
FIG. 4 is a diagram illustrating a boot firmware build orchestration process.

FIG. 4 is a diagram 400 illustrating a boot firmware build orchestration process 402. The boot firmware build orchestration process 402 is similar to the BMC firmware build orchestration process 300 for generating tailored firmware images. In particular, the build orchestrator can receive platform configurations and payload configurations to dynamically create a boot firmware (e.g., BIOS) image 410 compatible with the hardware.

A boot firmware image 410 includes an OS Payload Interface Layer 422, a Platform Orchestration Layer 424, and an FSP (Firmware Support Package) 426. The FSP 426 is provided by the silicon vendor for a particular CPU platform, analogous to a silicon provider IP block in the BMC firmware architecture. The Platform Orchestration Layer 424 includes an FSP interface 434 and handles platform-specific customizations.

Further, the build orchestrator enables developers, ODMs and OEMs to select validated components such as FSP, payloads, and vendor enhancements to build custom boot firmware tailored to their platform needs. The service model also allows tracking complete boot firmware development cycles for new platforms.

Thus, the boot firmware build orchestration process 402 utilizes the modular architecture to construct firmware images based on mutable platforms and payloads, similar to BMC firmware's dynamic handling of DC-MHS components like replaceable HPM and BMC modules. The build orchestrator abstracts platform complexities through validated components and layers such FSP interface, supporting flexible upgradeability.

Figure 5:
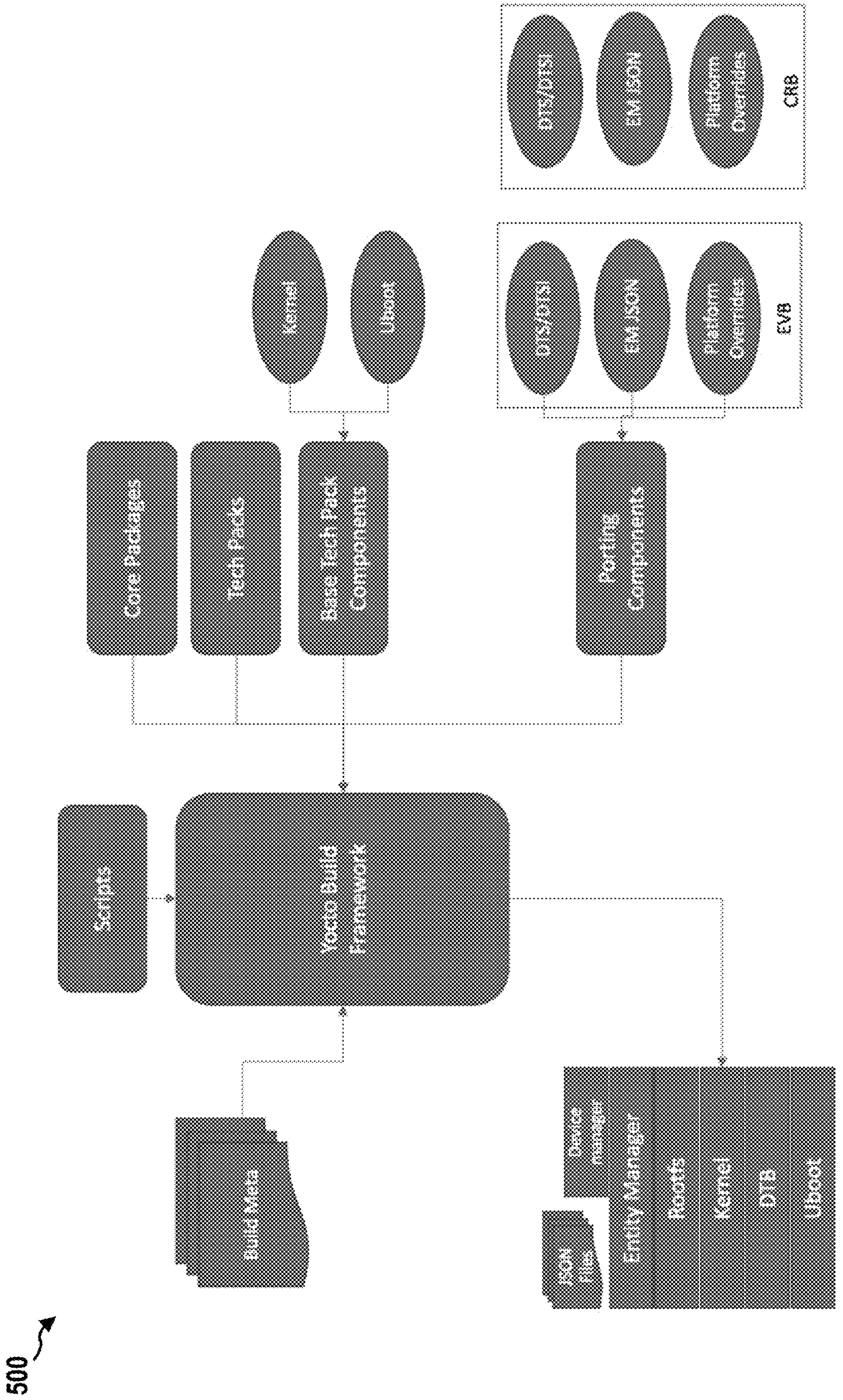
FIG. 5 is a diagram illustrating a Yocto Build Framework and its components implementing a BMC firmware build orchestration.

FIG. 5 is a diagram 500 illustrating a Yocto Build Framework and its components implementing the BMC firmware build orchestration. The Build Metadata is the input to the Yocto Build Framework. The Build Metadata provides configuration information to the Yocto Build Framework about the target platform, BMC system-on-chip (SOC), and other hardware details. Description A, the modular hardware system 200 can have interchangeable components such as the Host Processor Module (HPM) and the BMC in the Data Center Security Control Module (DC-SCM).

When these hardware components change, the Build Metadata helps the build orchestrator dynamically construct a compatible firmware image. For example, if the HPM 260 is swapped from an Intel to an AMD processor, the BMC 212 will detect this change and notify the build orchestrator. The build orchestrator will then reference the Build Metadata to determine the necessary drivers, binaries, and configurations to include in the new tailored BMC firmware image for that AMD platform.

Similarly, if the BMC 212 SOC itself changes, e.g., from Aspeed to Nuvoton, the Nuvoton meta layer will be injected instead of Aspeed to generate the firmware with the appropriate kernel, drivers, libraries etc. The Build Metadata contains pointers to the locations of these modular components in the Yocto layer repositories, facilitating dynamic assembly of compatible images.

Thus, the Build Metadata may refer to separate Yocto meta layers for each hardware configuration. By swapping these layers based on detected changes, customizable images can be built on the fly to match the mutable server modules like HPM and BMC. The interconnect abstraction provided by the DC-SCI 230 ensures connectivity remains consistent across such hardware fluctuations.

The Yocto Build Framework utilizes several core components to construct the BMC firmware image. A Build Orchestrator acts as the coordinator for the overall build process. For example, the Build Orchestrator listens for events from the BMC 212 indicating hardware changes in the modular system 200. When the HPM 260 or other components change, the Build Orchestrator initiates a build process to generate a tailored BMC image for deployment. A Build Engine handles the actual build process based on the configurations set by the Build Orchestrator. The Build Engine pieces together the necessary components like the Linux kernel, bootloaders, drivers etc. from Yocto layer repositories and builds the firmware image. For example, if the HPM 260 changes from Intel to AMD, the AMD processors may require a different kernel or drivers which the Build Engine acquires before compiling the image. A Package Manager manages the different packages and libraries that go into the firmware image. Packages such as the platform configuration capsules (PCCs) containing sensor mappings, platform events, configurations etc. can be modularly handled through the Package Manager. If a new HPM 260 alters the platform, relevant PCCs are pulled in by the Package Manager dynamically during the build for that target image. Thus, the key Yocto components enable customizable construction of BMC firmware images tailored to the mutable hardware modules in the modular hardware system 200. The Build Orchestrator, Build Engine and Package Manager abstract away complexities allowing portability across different HPMs and BMC SOCs.

The output of the Yocto Build Framework is a customized BMC firmware image that can be deployed to the BMC 212 module within the DC-SCM 210 of a modular hardware system 200.

When hardware components like the HPM 260 or BMC 212 change in this modular system, the Yocto Build Framework facilitates dynamic construction of compatible firmware images. For example, if the HPM 260 swaps from an Intel to AMD processor, the BMC 212 detects this change and triggers an image rebuild. The Yocto Build Framework then generates a tailored BMC firmware image including components such as: U-Boot Bootloader that handles booting the Linux kernel; Linux Kernel that is the core of the BMC firmware; Root Filesystem that contains binaries, libs, applications etc.; Device Tree Blob (DTB) that describes the BMC's hardware; Entity Manager Configuration that are for managing devices/sensors; Other packages and configuration files specific to the platform.

As such, the output is a customized BMC firmware image, with components tailored to that particular mutable platform configuration. The flexibility of the Yocto Build Framework output allows the BMC 212 firmware to adapt to hardware changes like HPM or BMC swaps in the modular hardware system 200.

Further, the Yocto Build Framework employs core packages, tech packages, and base tech package components. The core packages in the Yocto Build Framework refer to key components that enable building of customizable BMC firmware images based on platform changes detected from the modular hardware. To handle changes in these hardware modules, the Yocto Build Framework utilizes core packages that provide the Build Orchestrator, the Build Engine, and the Package Manager. Thus the core packages enable automated and tailored construction of BMC images based on hardware changes in the modular system 200.

The base tech components include fundamental elements commonly present across BMC firmware images built using Yocto framework. These include the kernel, the bootloaders such as U-Boot, the Root Filesystem containing applications, binaries, libraries etc., and the Device Tree Blob describing the hardware devices. Additional platform-specific or SOC-specific components can supplement these base components during build time based on modular plug-ins from tech packages.

The tech packages include modular metadata layers in Yocto framework containing recipes and packages to build BMC firmware images for specific BMC system-on-chips. For example, meta-aspeed layer has necessary components to compile image for Aspeed AST2500/AST2600 SOCs. Similarly, there can be meta-nuvoton layer for Nuvoton NPCM7xx SOCs.

If the BMC 212 hardware is upgraded in DC-SCM 210, the Build Orchestrator identifies the target SOC and injects the appropriate tech pack meta layer to generate compatible firmware.

The porting components provides to the Yocto Build Framework the modular configuration files that allow the BMC firmware image to support a specific hardware platform. These platform-specific configuration files are packaged into modules called platform configuration capsules (PCCs). The PCCs abstract away platform complexities through packages containing sensor mappings indicating physical layer and bus connectivity; platform event filter configurations for vendor-specific chip events; vendor libraries and configurations aligned to intellectual property; static reference tables facilitating identification and communication with platform components; and power and thermal profiles regulating server operations.

These modular platform abstraction files are fetched dynamically at runtime based on the detected hardware. For example, if the Host Processor Module (HPM) changes from Intel to AMD, the new CPU type triggers the BMC to pull in the respective PCC capsule to appropriately handle the revised platform configuration. Thus, platform-specifics are abstracted into modular PCCs for portable BMC firmware across hardware fluctuations.

In the Yocto context, some example platform configuration files are device tree source (DTS), entity manager JSON, platform overrides from reference boards, etc. The Device Tree Source (DTS), for instance, delineates the hardware layout of a device and is indispensable for the Linux kernel to comprehend the hardware specifics upon which it operates.

The Entity Manager JSON files specify the management configuration for sensors and devices on the server system. This allows the BMC 212 to correctly manage and interface with sensors, handling alterations upon hardware changes.

Platform overrides are modifications from default configurations tailored to the specific needs of a given platform. These overrides might include adjustments to configurations for Evaluation Boards (EVB) and Customer Reference Boards (CRB).

Scripts are automated sequences that expedite numerous procedures pertinent to BMC firmware generation, such as compilation, downloading, and testing. Scripts could facilitate the process outlined by the build orchestrator, thereby assuring that the BMC firmware, such as for the BMC 212 on the DC-SCM 210, is coherent with the requirements arising from hardware modifications.

By employing scripts, tasks that were previously manual, time-consuming, and potentially error-prone become streamlined and consistent. This automation is particularly crucial in a modular hardware context where the flexible nature of systems necessitates frequent and dynamic updates to firmware to accommodate changes in components such as the HPM 260 or CPUs within the system.

Scripts may be input into Yocto the Build Framework for automation/orchestration with respect to: downloading, building and testing modular firmware components maintained in remote repositories; initiating Yocto-based builds by injecting appropriate layers upon hardware change detection; managing dependencies and configurations dynamically during image construction. These automated build tasks allow rapid, customized assembly of BMC images compatible with the altered platform personalities. Orchestration scripts reduce manual efforts, facilitating portable firmware deployment in line with modular hardware upgrades.

Figure 6:
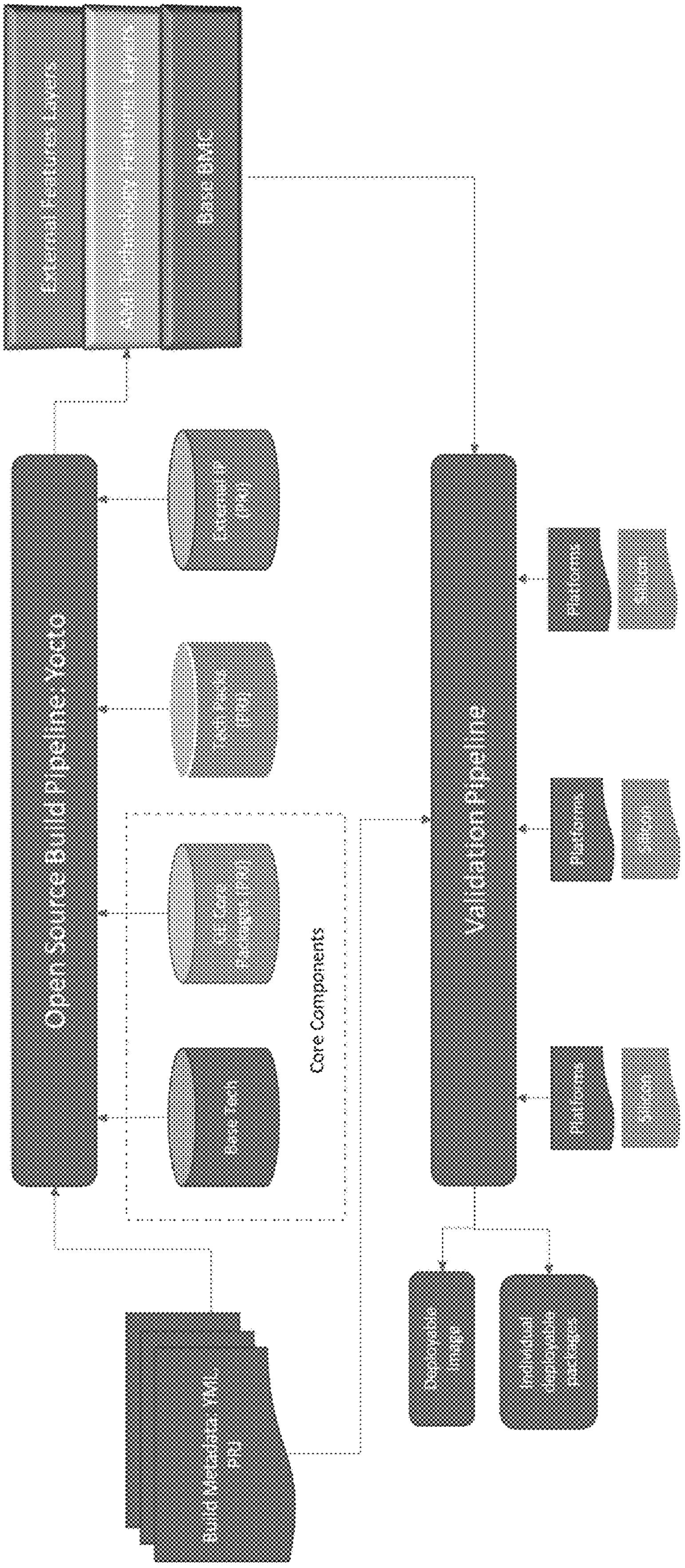
FIG. 6 is a diagram illustrating a BMC image build process.

FIG. 6 is a diagram 600 illustrating a BMC image build process. An open source build pipeline is a set of tools and processes that are used to build the BMC firmware image. The build pipeline uses the build metadata to determine which components, from the core packages, tech packages, base tech package, and external IP components, to include in the image, and then builds an initial BMC firmware image using the Yocto framework. It compiles the firmware components into a single image. The external IP packages are components that are provided by third parties. They can include drivers, libraries, or other software components that are not part of the base tech packages or tech packs. The external IP packages are optional, and customers can select which ones to include in their BMC firmware image.

The validation pipeline is a set of tests that are used to verify that the initial BMC firmware image is functioning properly. The validation pipeline selects one or more test platforms from multiple platforms and verifies the BMC firmware image meets the expected requirements.

The deployable image is the final product of the build and validation pipelines. It is a single firmware image that can be deployed to the BMC. The deployable image includes all of the necessary components to run the BMC, including the kernel, bootloaders, root filesystem, and tech packs. Further, individual deployable packages may be generated by the build and validation pipelines.

In certain configurations, the Build Metadata may be specified in a YAML file. Each YAML element contributes to the dynamic and modular firmware build process tailored to a specific platform and SOC configuration in a data center server environment.

The YAML file may include a section as follows:

GeneralInfo:
  Project-Platform: <Platform-Name>
  CPU-Family: <Intel/AMD/ARM>
  BMC SOC: <SOC-Name>

The 'GeneralInfo' section provides a high-level overview of the target platform for the BMC image build. For instance, if the HPM 260 (Host Processor Module) were to be built with this YAML file, the 'Project-Platform' field would specify the name of the platform such as 'Archercity' or the modular server system 200 that this build pertains to. The 'CPU-Family' would denote the type of processor family, like Intel, AMD, or ARM, which are central cores like CPU0 and CPU1 within the HPM 260. The 'BMC SOC' field specifies the system-on-chip name for the BMC such as the BMC 212 utilized within DC-SCM 210.

The YAML file may include another section as follows:

Platform-Configuration
  SPX-REPO:
  Description: <Porting files for the particular Platform>
  URL: <URL>
  DirName: <Porting Directory>
  Branch: <Branch-Name>
  Recursive: yes
  BaseRepo: no This section delineates the platform-specific configuration repositories or 'SPX-REPO' essential for porting the firmware to accommodate changes in the modular hardware such as the DC-SCM 210. For example, if an upgraded silicon chip was adopted, the 'DirName' and 'Branch' fields would refer to a specific directory and version in the repository where the relevant porting files are available. These files may include configuration elements specific to the 'Platform-Name' mentioned in 'GeneralInfo' and work in conjunction with the standardized communication protocols set by DC-SCI 230.

The YAML file may also include a section as follows:

SPX-REPO:
  Description: <Meta Layer for the SOC>
  URL: <URL>
  DirName: <SOC layer Directory>
  Branch: <Branch-Name>
  Recursive: yes
  BaseRepo: no This entry under 'Platform-Configuration' is targeted at compiling data specific to the BMC's SOC. Each SOC may be from a different vendor, thus having different properties and requirements for its firmware. As such, if the BMC 212 within the DC-SCM 210 needed to be updated to align with the new SOC name indicated under 'GeneralInfo', the orchestrator would retrieve the meta layer corresponding to that SOC from the indicated 'URL', 'DirName', and 'Branch'.

Further, The YAML file includes sections as follows:

Yocto-Layer-List:
Yocto-Layer:
  Description: AST2600 layer
  Protocol: git
  URL: . . . .
  Recursive: yes
  Branch:
  LayerDestPath
Yocto-Layer:
  Description: AST2500 layer
  Protocol: git
  URL: . . . .
  Recursive: yes
  Branch:
  LayerDestPath: meta-ast2500

The 'Yocto-Layer-List' contains all the necessary metadata required for the Yocto Build Framework to construct the BMC firmware. Each 'Yocto-Layer' is a directive for the build system to incorporate specific sets of code and configuration determined by meta layer descriptions such as 'AST2600 layer' or 'Nuvoton NPCM750 layer'. These layers support the dynamic and modular nature of the firmware assembly process, allowing the firmware to be tailored to the specifics of the HPM 260, BMC 212, or any changes made to the server system's configuration. Utilizing 'git' as the protocol ensures that version control is maintained, and the system can recursively access all necessary submodules within the layers.

Utilizing such a YAML file, the build orchestration system can initiate and manage a Yocto build, thereby producing a firmware image compatible with a plethora of platform and SOC combinations as found in modern modular server systems. This flexibility is paramount in ensuring that firmware deployment can keep pace with the hardware evolution demonstrated in items like HPM 260, BMC 212, and interfaces such as DC-SCI 230, which interconnect various modules within the data center infrastructure.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

What is claimed is:

1. A method of building a customized firmware image, comprising:

initializing a build orchestrator configured to monitor system events from different server systems;

detecting, by a baseboard management controller (BMC) of a data center security and control module (DC-SCM) in a modular hardware system, a hardware change in a host processor module (HPM) of the modular hardware system, wherein the detecting comprises comparing field replaceable unit (FRU) details of the HPM to FRU details stored in a memory of the BMC;

collecting, by the BMC, processor information comprising a type of CPU of the HPM based on the detected hardware change;

receiving, at the build orchestrator, an event indicating the detected hardware change in the modular hardware system, the event comprising the processor information transmitted by the BMC to the build orchestrator through an application programming interface (API) of the build orchestrator;

selecting, by the build orchestrator, appropriate firmware components for the detected hardware change based on the processor information; and assembling the selected firmware components into the customized firmware image tailored to the detected hardware change, wherein the assembling comprises injecting a system-on-chip (SOC) specific meta-layer into a build framework to generate the customized firmware image compatible with the HPM.

2. The method of claim 1, wherein the customized firmware image is a baseboard management controller (BMC) firmware image or a boot firmware image.

3. The method of claim 1, wherein selecting appropriate firmware components comprises: identifying a target platform based on the detected hardware change; determining a system-on-a-chip (SOC) module associated with the modular hardware system; and selecting modular firmware components corresponding to the identified target platform and SOC module.

4. The method of claim 3, wherein the modular firmware components are selected from a group comprising Linux kernel, U-Boot bootloader, root filesystem, and platform configuration capsules.

5. The method of claim 1, wherein assembling the selected firmware components comprises configuring the selected firmware components using a build orchestration system implementing an open source build framework.

6. The method of claim 5, wherein the open source build framework includes the build orchestrator, a build engine, and a package manager to facilitate construction of the customized firmware image.

7. The method of claim 1, further comprising: transmitting the customized firmware image to the modular hardware system.

8. The method of claim 7, further comprising: updating a pre-existing firmware image in the modular hardware system using the customized firmware image.

9. The method of claim 1, wherein the detected hardware change pertains to one or more of: the host processor module (HPM), the baseboard management controller (BMC), a device configuration.

10. The method of claim 1, further comprising validating the customized firmware image on one or more test platforms prior to deploying to the modular hardware system.

11. The method of claim 1, further comprising dynamically fetching platform-specific configuration files during the assembly of the customized firmware image.

12. The method of claim 11, wherein the platform-specific configuration files include one or more of Sensor Data Record (SDR) information, platform event filter configurations, entity manager configurations, static tables for platform components, and power and thermal management algorithms.

13. The method of claim 1, further comprising using a configuration file to instruct the build orchestrator on the selection and assembly of firmware components for the customized firmware image based on the detected hardware change.

14. The method of claim 13, wherein the configuration file specifies general platform information, platform-specific repository metadata, metadata for a system-on-chip (SOC) specific to the baseboard management controller, and listings for compiling the firmware components.

15. The method of claim 1, further comprising triggering the build orchestrator to initiate the assembly of the customized firmware image in response to changes detected in device configurations within the modular hardware system.

16. The method of claim 1, wherein the build orchestrator is configured to build the customized firmware image by injecting appropriate meta-layers into a build process according to the detected hardware change.

17. The method of claim 1, wherein the detected hardware change includes a swap or upgrade of a compute unit within the modular hardware system, necessitating a reconfiguration of firmware to accommodate corresponding updated hardware specifications.

18. An apparatus for building a customized firmware image, comprising: a memory; and at least one processor coupled to the memory and configured to:

initialize a build orchestrator configured to monitor system events from different server systems;

detect, by a baseboard management controller (BMC) of a data center security and control module (DC-SCM) in a modular hardware system, a hardware change in a host processor module (HPM) of the modular hardware system, wherein the detecting comprises comparing field replaceable unit (FRU) details of the HPM to FRU details stored in a memory of the BMC;

collect, by the BMC, processor information comprising a type of CPU of the HPM based on the detected hardware change;

receive, at the build orchestrator, an event indicating the detected hardware change in the modular hardware system, the event comprising the processor information transmitted by the BMC to the build orchestrator through an application programming interface (API) of the build orchestrator;

select, by the build orchestrator, appropriate firmware components for the detected hardware change based on the processor information; and assemble the selected firmware components into the customized firmware image tailored to the detected hardware change, wherein the assembling comprises injecting a system-on-chip (SOC) specific meta-layer into a build framework to generate the customized firmware image compatible with the HPM.

19. The apparatus of claim 18, wherein the customized firmware image is a baseboard management controller (BMC) firmware image or a boot firmware image.

20. A non-transitory computer-readable medium storing computer executable code for building a customized firmware image, comprising code to:

initialize a build orchestrator configured to monitor system events from different server systems;

detect, by a baseboard management controller (BMC) of a data center security and control module (DC-SCM) in a modular hardware system, a hardware change in a host processor module (HPM) of the modular hardware system, wherein the detecting comprises comparing field replaceable unit (FRU) details of the HPM to FRU details stored in a memory of the BMC;

collect, by the BMC, processor information comprising a type of CPU of the HPM based on the detected hardware change;

receive, at the build orchestrator, an event indicating the detected hardware change in the modular hardware system, the event comprising the processor information transmitted by the BMC to the build orchestrator through an application programming interface (API) of the build orchestrator;

select, by the build orchestrator, appropriate firmware components for the detected hardware change based on the processor information; and assemble the selected firmware components into the customized firmware image tailored to the detected hardware change, wherein the assembling comprises injecting a system-on-chip (SOC) specific meta-layer into a build framework to generate the customized firmware image compatible with the HPM.

* * * * *